United States Patent [19]

Paleologou et al.

[11] Patent Number: 5,006,211

[45] Date of Patent: Apr. 9, 1991

[54] ELECTRODIALYLIC WATER SPLITTING PROCESS FOR THE TREATMENT OF AQUEOUS ELECTROLYTES

[75] Inventors: Michael Paleologou, Pierrefonds; Richard M. Berry, Ile Perrot, both of Canada

[73] Assignee: Pulp and Paper Research Institute of Canada, Pointe Claire, Canada

[21] Appl. No.: 340,200

[22] Filed: Apr. 19, 1989

[51] Int. Cl.$^5$ ............................ C25B 7/00; C25B 1/16
[52] U.S. Cl. .................................. 204/182.4; 204/98; 204/83; 204/301
[58] Field of Search .................. 204/182.3, 182.4, 152, 204/301, 84, 83, 98

[56] References Cited

U.S. PATENT DOCUMENTS 4,391,680  7/1983  Mani et al. ........................... 204/98
4,557,815  12/1985  Scott et al. ......................... 204/182.2
4,740,281  4/1988  Chlanda et al. ..................... 204/151

Primary Examiner—John F. Niebling
Assistant Examiner—Arun S. Phasge
Attorney, Agent, or Firm—Lawrence I. Field

[57] ABSTRACT

A process for dealkalization or acidification of aqueous salt solutions or for the splitting of the salt of such solutions employs a water splitting system of bipolar membranes in conjunction with ion selective membranes; a two component cell employs cation permselective membranes to define acid and base compartments with the bipolar membranes, and a three compartment cell employs anion permselective and cation permselective membranes to define with the bipolar membrane salt, acid and base compartments; the process has particular applicability to the dealkalization of a monosodium peroxide solution containing sodium hydroxide produced in a hydrogen peroxide generator.

34 Claims, 2 Drawing Sheets

ELECTRODIALYLIC WATER SPLITTING PROCESS FOR THE TREATMENT OF AQUEOUS ELECTROLYTES

BACKGROUND OF THE INVENTION (i) Field of the Invention

This invention is concerned with processes for dealkalization or acidification of aqueous salt solutions, as well as for the splitting of the salt of such solutions employing a water splitting system.

More especially the invention relates to the dealkalization and/or acidification of alkaline or non-alkaline aqueous solutions of various compositions; and to the dealkalization and/or splitting of the salt of alkaline or non-alkaline aqueous solutions of various compositions.

(ii) Description of Prior Art

The simplest case involves the partial dealkalization of an alkaline but otherwise pure solution of water to a minimum conductivity dictated by the efficient operation of a 2-compartment or 3-compartment water splitter. Assuming that sodium hydroxide is the base to be removed the minimum operational conductivity is about 20 mS/cm and the corresponding concentration of sodium hydroxide is about 0.1M. For a better efficiency in terms of power consumption a conductivity of 30 mS/cm corresponding to a concentration of NaOH of 0.15M is recommended. The cation of the base could be the type that does not hydrolyze (e.g. Na+) or the type that does (e.g. NH4+).

In the case of a 3-compartment water splitter the co-products are sodium hydroxide (base compartment) and water (acid compartment). In order to maintain conductivity in the acid compartment an electrolyte (acid, base or salt) should be added of a concentration sufficient to maintain a minimum conductivity of 20 mS/cm. This solution can be continuously recirculated through the acid loop.

A second case in a first embodiment involves the partial or complete dealkalization and/or acidification of an alkaline or non-alkaline solution of a salt of the type whose cation and anion do not hydrolyze in water (e.g. NaCl) using a 2-compartment water splitter. In this case the removal of alkali cations can continue beyond the complete dealkalization point thus acidifying the aqueous salt solution by replacing the displaced alkali cations with hydrogen ions; this process is covered in U.S. Pat. No. 4,391,680 by Mani and Chlanda. The acidification process in this case can continue until completion since the conductive salt is being replaced by an acid which is even more conductive than the salt itself.

A second embodiment of the second case involves the partial or complete dealkalization and/or splitting of the salt of an alkaline or non-alkaline solution of a salt of the type whose cation and anion do not hydrolyze in water (e.g. NaCl) using a 3-compartment water splitter. In this case since the hydroxyl anions are more mobile and in addition are better bases than any other ions they would be expected to preferentially migrate to the acid compartment over the competing anions of the salt. Depending on the relative migration rates of hydroxyl and the anion of the salt, the salt may have to be partially depleted before being completely dealkalized. As in case 1 an electrolyte may have to be added to the acid compartment in order to maintain conductivity in the system. Electrohydrolysis can continue beyond the complete dealkalization point thus splitting the salt into its corresponding acid (e.g. HCl) and base (e.g. NaOH). This process which has been covered in U.S. Pat. No. 2,829,095 to Oda et al, can efficiently continue until the conductivity of the salt compartment reaches about 20 ms/cm.

A third case in a first embodiment involves the partial or complete dealkalization and/or acidification of an alkaline or non-alkaline solution of a salt of the type whose cation does not hydrolyze but whose anion does to produce hydroxyl ions, (e.g. NaHO$_2$)using a 2-compartment water splitter. In this case the alkali cation removal process can continue beyond the complete dealkalization point thus modifying the aqueous salt solution by replacing the displaced alkali cations with hydrogen cations. In this case, however, the extent of alkali cation removal is limited by the degree of ionization of the acid produced, which is usually very weak. Since, during the alkali cation removal process the original salt is being replaced by a very weak acid, this process can only efficiently continue as long as the decreasing conductivity of the depleted salt solution remains above 20 mS/cm.

A second embodiment of the third case involves the partial or complete dealkalization and/or splitting of the salt of an alkaline or non-alkaline solution of a salt of the type whose cation does not hydrolyze but whose anion does to produce hydroxyl ions, (e.g. NaHO$_2$) using a 3-compartment water splitter. In this case the alkali cations (e.g. Na$^+$) migrate to the base compartment in which alkali metal and/or non-metal hydroxide (e.g. NaOH) is formed whereas the hydroxyl anions as well as the anions of the salt (e.g. HO$_2$-) migrate to the acid compartment in which water and the acid of the anion of the salt (e.g. H$_2$O$_2$) form. Since, however, both the hydroxyl anions and the anions of the salt migrate simultaneously to the acid compartment it is not possible to remove all caustic from the salt compartment without deleting the salt itself. Another problem is that none of the compounds forming in the acid compartment (e.g. H$_2$O and H$_2$O$_2$) are conductive. The solution to both of these problems is the addition of alkali metal and/or non-metal hydroxide (e.g. NaOH) electrolyte into the acid compartment. In this way the formation of the acid of the anion of the salt (e.g. H$_2$O$_2$) is avoided and instead the salt of the anion is formed (e.g. NaHO$_2$). Thus, the desired ratio of alkali metal and/or non-metal hydroxide to salt of the migrating anion can be achieved in the acid loop by adjusting the original concentration of alkali metal and/or non-metal hydroxide in this loop and/or the extent of electrohydrolysis.

A fourth case involves the partial or complete dealkalization and/or acidification and/or splitting of the salt of an alkaline or non-alkaline solution of a salt of the type whose anion does not hydrolyze but whose cation does to produce hydrogen ions (e.g. NH$_4$Cl) In the presence of a hydroxide of an alkali metal and/or non-metal (e.g. NaOH) the hydrolysis equilibrium of the cation shifts completely to the right, e.g.

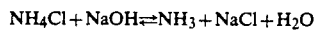

$$NH_4Cl + NaOH \rightleftharpoons NH_3 + NaCl + H_2O$$

thus forming a solution of alkali metal chloride; its dealkalization and/or acidification and/or splitting of the salt is, therefore expected to be as in case 2. Since the anion is of the type that does not hydrolyze the acidification is expected to proceed as in case 2. The process can continue until the conductivity in the salt compartment is about 20 mS/cm.

A fifth case involves the partial or complete dealkalization and/or acidification and/or splitting of the salt of an alkaline or non-alkaline solution of a salt of the type whose cation as well as anion hydrolyze to produce hydroxyl and hydrogen ions respectively, (e.g. $NH_4HO_2$) The initial pH of the solution of such a salt will depend on the relative hydrolysis constants of the cation and anion. In an alkaline solution of a salt of this type the hydrolysis of the anion is suppressed and the hydrolysis of the cation is carried to completion. This suggests that the dealkalization of such solutions will proceed as in case 2. As the dealkalization proceeds, however, the hydrolysis of the cation will increasingly be suppressed and the hydrolysis of the anion would be carried closer to completion; therefore, the latter part of the dealkalization process and the splitting of such salts is likely to proceed as in case 3. In an acidic solution of the salt in question the hydrolysis of the cation would be completely suppressed and the hydrolysis of the anion would be carried to completion; therefore the acidification of such solutions will proceed as in case 3.

The sixth case involves alkaline or nonalkaline solutions of the types discussed in cases 1 to 5 above, but also containing water soluble but non-conductive compounds (e.g. ethanol) and/or insoluble but suspended compounds (e.g. $Mg(OH)_2$ colloidal particles).

In all of the cases described above employing a 3-compartment water splitter the co-products are the hydroxide of the alkali metal and/or non-metal cation that was removed from the original solution and the acid of the anion of the salt.

A problem exists in processes for the complete dealkalization of an alkaline monosodium peroxide ($NaHO_2$) solution. Solutions such as these are produced by the reduction of oxygen in electrolytic cells employing sodium hydroxide as the electrolyte in the anode compartment, (e.g. the Dow on-site peroxide generator, U.S. Pat. Nos. 4,224,129 and 4,317,704). Since, however, completely dealkalized solutions of monosodium peroxide are needed for the efficient bleaching of mechanical pulps the need exists for the dealkalization of these solutions. Alternate approaches, such as acidification of the solution from an external source, consume the acid added, waste caustic soda and furthermore change the nature of the solution, since a new salt is formed as a result of the neutralization reaction.

Approaches other than the addition of acid from an external source, for the dealkalization and/or acidification of aqueous solutions, include: electrolytic systems (e.g. U.S. Pat. No. 4,671,863 by Tejeda), ion-exchange systems employing strong-acid cation resins, weak-acid cation resins, and anion resins (e.g. McGarvey, F. X., Power, 128(8), 59-60, 1984), systems employing magnetic ion-exchange resins in fluidized bed adsorbers (e.g. Bolto et al, J. Chem. Technol. Biotechnol., 29(6), 325-31, 1979) and electrodialytic systems (e.g. U.S. Pat. No. 3,893,901 by Tejeda). The ion-exchange systems referred to above are primarily intended for the removal of trace amounts of alkali from water for purification purposes; the scale-up of such systems, for the removal of large quantities of alkali from industrial streams, would be uneconomical because of the high cost associated with the regeneration of ion-exchange columns. In addition, in such systems, alkali is obtained in the form of a salt and not caustic. Electrolytic systems, on the other hand, recover the alkali in the form of caustic, the energy costs associated with dealkalization, however, are significantly higher than those associated with water splitting techniques.

Membrane systems involving stacked pairs of membranes have been recommended for various applications. These include desalination (U.S. Pat. No. 3,654,125 to Leitz), springing of sulfur dioxide from aqueous sulphite and bisulfite solutions (U.S. Pat. No. 4,082,835 to Chlanda et al), the removal of alkali metal cations from aqueous alkali metal chloride solutions so as to produce an acidified salt solution and sodium hydroxide (U.S. Pat. No. 4,391,680 to Mani and Chlanda) and the recovery of valuable metal or ammonium values from materials comprising a salt of a first acid while avoiding the formation of gas bubbles (U.S. Pat. No. 4,592,817 to Chlanda and Mani). In none of the aforementioned systems, however, suggestion is made for their application to the partial or complete dealkalization of alkaline alkali metal and/or non-metal salt solutions. Furthermore, for only one type of salt (case 2) reference is made to the acidification of solutions of salts (U.S. Pat. No. 4,592,817 to Chlanda and Mani).

Membrane systems involving water splitters in the three-compartment configuration have been recommended for various applications. These include the recovery of fluorine values from fluorosilic acid aqueous streams by electrodialytic water splitting of fluoride salt to hydrofluoric acid and hydroxide base (U.S. Pat. No. 3,787,304 to Chlanda et al), the recovery of $TiO_2$ from ilmenite-type ores by digestion with hydrofluoric acid, in which hydrofluoric acid and ammonium hydroxide are recovered by an electrodialytic water-splitting process from by-product aqueous ammonium fluoride (U.S. Pat. No. 4,107,264 by Nagasubramanian and Liu), the conversion of alkali metal sulfate values, such as sodium or potassium values in spent rayon spin bath liquors, into alkali metal hydroxide and alkali metal sulfate/sulfuric acid (U.S Pat. No. 4,504,373 by Mani and Chlanda) and the recovery of metal or ammonium values from materials comprising a salt of a first acid while avoiding formation of gas bubbles in the electrohydrolysis cells. In none of the aforementioned systems, however, suggestion is made for their application to the partial or complete dealkalization of alkaline alkali metal and/or non-metal salt solutions; furthermore, no attempt is made to cover the splitting of the dealkalized or neutral salts of various types as described above.

SUMMARY OF THE INVENTION

It is an object of this invention to provide a process for dealkalization or acidification of aqueous salt solutions.

It is a further object of this invention to provide a process for the splitting of the salt of an alkaline or non-alkaline aqueous salt solution.

It is still a further object of this invention to provide such processes employing a two compartment membrane cell based on a cation permselective membrane and bipolar membranes.

It is yet another object of this invention to provide such processes employing a three compartment membrane cell based on anion permselective and cation permselective membranes and bipolar membranes.

In accordance with the invention there is provided a process which comprises the steps of: (a) providing a cell comprising an anode, a cathode and at least two compartments therebetween defined at least in part by a cation permselective membrane and at least a pair of bipolar membranes, said bipolar membranes having a cation side facing said cathode and an anion side facing said anode, (b) feeding an aqueous solution of a salt MX into a first of said compartments to contact a first side of said cation permselective membrane, wherein M is a cation selected from alkali metal and non-metal cations and X is an anion of an acid, c) feeding a liquid comprising water into a second of said compartments to contact an anion side of a said bipolar membrane, (d) passing a direct current through said cell between said anode and cathode to effect: (i) migration of said cation M from said first compartment through said cation permselective membrane into said second compartment, and (ii) splitting of water by said bipolar membrane of said second compartment with accumulation of hydroxide ions of the cation in said second compartment and removal of hydrogen ions of the water from said second compartment, (e) removing accumulated MOH from said second compartment, and (f) removing accumulated HX from said first compartment.

DESCRIPTION OF PREFERRED EMBODIMENTS (i) Two Compartment Cell

In accordance with the invention it has been found that a dealkalized monosodium peroxide solution can be generated from an alkaline monosodium peroxide solution without the addition of acid from an external source by using a two compartment water splitter employing a cation membrane and a bipolar membrane. The co-product is aqueous alkali metal hydroxide (e.g. NaOH) which may have a concentration which is considerably higher than the concentration of the caustic in the alkaline monosodium peroxide solution. Depending on the current used and the desired concentration of the co-product very high current efficiencies can be achieved during the dealkalization process.

Thus the invention contemplates a process which includes the following steps:
- (a) feeding an aqueous alkaline monosodium peroxide solution into a two compartment water splitter composed of alternating cation and bipolar membranes; the solution is introduced into each acid compartment between a cation membrane and the cation side of a bipolar membrane;
- (b) feeding a liquid comprising water into each base compartment, between a cation membrane and the anion side of a bipolar membrane;
- (c) passing a direct current through said water splitter, thereby causing the transfer of alkali metal cations from the alkaline monosodium peroxide solution to the base compartment thereby causing dealkalization of the alkaline monosodium peroxide solution and basification of the liquid comprising water;
- (d) bleeding from the acid compartments a dealkalized aqueous monosodium peroxide solution;
- (e) bleeding from the base compartments a liquid comprising aqueous alkali metal hydroxide.

In step (d) the dealkalized aqueous monosodium peroxide solution bled from the acid compartments may, in particular, comprise between O and x moles of sodium hydroxide per x moles of monosodium peroxide. This solution of monosodium peroxide can be used directly for the bleaching of mechanical pulps, especially if the dealkalization is complete (i.e. $x=O$).

In step (e) the alkali metal hydroxide bled from the base compartments may suitably be recycled to a hydrogen peroxide generator or may be used directly for bleaching of chemical or mechanical pulps.

The two compartment water splitter employed in the process of the invention may be any of the systems described in U.S. Pat. No. 4,082,835 to Chlanda et al (1979). The two compartment water splitter is composed of a large number of cationic and bipolar membranes alternately stacked between two electrodes.

Bipolar membranes are composite membranes consisting of three parts, a cation selective region, an anion selective region and the interface between the two regions. When a direct current is passed across a bipolar membrane with the cation selective side toward the cathode, electrical conduction is achieved by the transport of $H^+$ and $OH^-$ ions which are obtained from the dissociation of water. The water splitter employs suitable bipolar membranes, that can be of the type described, for example, in U.S. Pat. No. 2,829,095 to Oda et al, in U.S. Pat. No. 4,024,043 (single film bipolar membranes), in U.S. Pat. No. 4,116,889 (cast bipolar membranes) or any other type which effectively converts water into hydrogen and hydroxy ions.

The cation membranes useful in the process of the invention can be weakly acidic or strongly acidic cation permselective membranes. Examples of suitable cation membranes are Nafion (Trade Mark) R 110,901 and 324 of E. I. Du Pont de Nemours & Co.; but other commercially available cationic membranes can be used.

In general, stacks that are suitable for electrodialysis can be used for the water splitter. Such stacks are available commercially from Asahi Glass Co., 1-2, Marunouchi 2-chome, Chiyoda-Ku, Tokyo, Japan; Ionics Inc., Watertown, Mass. and other commercial sources.

The operating temperature of the two compartment water splitter may be any temperature compatible with the membranes and above the freezing point of the solutions, preferably in the 20° to 60° C. range.

The alkaline salt could be any soluble salt consisting of a monovalent cation, for example, the Group Ia alkali metals or other monovalent cations, for example, ammonium cations; and any anion, for example, the anions of the Group VIIa elements or other anions, for example, sulphate, acetate, oxalate, perhydroxyl, etc.

The operation of the water splitter is further described below:

The aqueous alkaline monosodium peroxide fed into the acid compartments of the electrohydrolysis stack is typically a 1:1 caustic to monosodium peroxide mixture but may also be composed of different ratios. Magnesium sulphate (120 ppm) is added to the said feed solution in order to prevent the decomposition of hydrogen peroxide into oxygen and water which is otherwise quite pronounced. In the absence of the magnesium sulphate stabilizer bubbling due to oxygen evolution hinders considerably the normal operation of the system. Any concentration between 100 and 400 ppm is sufficient to prevent decomposition of hydrogen peroxide in stationary aqueous solutions or such solutions in an electrohydrodynamic environment (e.g. water splitter). In the indicated concentration range magnesium sulphate is in the form of colloidal magnesium hydroxide particles suspended in solution.

Typically, the concentration of the alkaline monosodium peroxide solution is 0.5M in caustic and 0.5M in monosodium peroxide. These concentrations, however, can be higher or lower without adversely affecting the normal operation of the system. Preferably, the feed solution is free of divalent and trivalent cations in large quantities (e.g. $Ca^{++}$, $Mg^{++}$, $Fe^{++}$ or $Fe^{+++}$), that will either migrate across the cation membrane and precipitate in the by-product alkali metal hydroxide solution or will precipitate and foul the cation membrane, however, the process can tolerate trace amounts of such divalent and trivalent metal ion impurities and their corresponding anions.

In this application, however, the problem arising from such cations are minimal, if not nonexistent, since in the presence of excess sodium hydroxide, colloidal hydroxides are formed which due to their slightly negative charge are not expected to migrate through the cationic membrane towards the cathode.

The liquid fed to the base compartments may be water alone, or may be water with any of a variety of electrolytes in it. Preferably, this liquid is neutral or basic (pH 7-14).

The current passed through the water splitter in conventional fashion is direct current of a voltage dictated by the resistance of the membranes and the various solution streams between the two electrodes. Current densities between about 50 and about 150 mAs per square centimeter are preferred. Higher or lower current densities are contemplated, however, for certain specific applications.

The result of the current flow is electrodialysis to produce a dealkalized monosodium peroxide solution in the acid compartments and a liquid comprising sodium hydroxide in the base compartments. It is contemplated that the concentration of the product sodium hydroxide solution may be quite different from the sodium hydroxide concentration in the feed alkaline monosodium peroxide solution. This can be accomplished by adjusting the feed rates into the two compartments or the concentrations of the feed solutions.

Representative monosodium peroxide concentrations in the feed solution are between 0.25 and 2M, while sodium hydroxide concentrations in the same solutions are 0.25 to 3M. the relative ratio of caustic to monosodium peroxide is dictated by the mode of operation of the hydrogen peroxide generator. If one begins with a feed solution which is 0.5M in monosodium peroxide and sodium hydroxide, which is a typical Dow Hydrogen Peroxide Generator solution, then the output of the acid compartments of the water splitter will be adjusted to be 0.0M in sodium hydroxide and 0.5M in monosodium peroxide. The output of the base compartments is usually set to be 1M.

The residence time of the aqueous alkaline alkali metal salt solution in the acid compartments is sufficient to cause this solution to have a molar ratio of NaOH to $NaHO_2$ between 0 and 1. In particular this residence time is sufficiently long to dealkalize completely the solution and to acidify it to a molar ratio of acid ($H_2O_2$) to salt ($NaHO_2$) of between 0 and 1.13.

The liquid comprising aqueous alkali metal hydroxide withdrawn from the base compartments suitably has a concentration between about 4 and about 10 weight percent alkali metal hydroxide. (ii) Three Compartments In accordance with the invention it has been found that a dealkalized monosodium peroxide solution can be generated from an alkaline monosodium peroxide solution, without the addition of acid from the external source, by using a three compartment water splitter employing alternate cationic, bipolar and anionic membranes. The co-products are aqueous alkali metal hydroxide (e.g. NaOH), which may have a concentration which is considerably higher than the concentration of the caustic in the alkaline monosodium peroxide solution, and a depleted alkaline monosodium peroxide solution. Depending on the current used and the desired concentration of the co-product high current efficiencies can be achieved during the dealkalization process.

The present invention contemplates a process which includes the following steps:

(a) feeding an aqueous alkaline monosodium peroxide solution into a three compartment water splitter composed of alternating cation, bipolar, and anionic membranes; the solution is introduced into each salt compartment between a cation membrane and an anion membrane;

(b) feeding a liquid comprising water into each base compartment, between a cation membrane and the anion side of a bipolar membrane;

(c) feeding into each acid compartment, between an anion membrane and the cation side of a bipolar membrane, a solution of sodium hydroxide of a concentration equivalent to the desired concentration of monosodium peroxide to be produced;

(d) passing a direct current through the water splitter thereby causing the transfer of alkali metal cations from the alkaline monosodium peroxide solution to the base compartment thereby causing basification of the liquid comprising water, and in addition causing the transfer of hydroxide and perhydroxide anions to the acid compartment thereby causing the formation of water and hydrogen peroxide; the latter reacts with the added sodium hydroxide in this compartment to produce monosodium peroxide, (e) bleeding from the salt compartments a partially dealkalized and depleted aqueous monosodium peroxide solution;

(f) bleeding from the base compartments a liquid comprising aqueous alkali metal hydroxide;

(g) bleeding from the acid compartments a dealkalized monosodium peroxide solution.

The solution bled from the salt compartment in (d) may be fed to another water splitter for further dealkalization, or recycled to a hydrogen peroxide generator.

Part of the liquid bled from the base compartments (b) can be recycled to the acid compartment of the water splitter and part can be recycled to a hydrogen peroxide generator or used directly for the bleaching of chemical or mechanical pulps.

In step (g) the bled solution may comprise between 0 and x moles of monosodium peroxide per x moles of sodium hydroxide initially added to this compartment. This solution can be used directly for the bleaching of mechanical pulps if the ratio of monosodium peroxide to sodium hydroxide is adjusted to be 1:0.

The three compartment water splitter employed in the process of the invention may be any of the systems described in U.S. Pat. No. 4,592,817 to Chlanda et al. The three compartment water splitter is composed of a large number of cationic, bipolar and anionic membranes alternatively stacked between two electrodes.

Bipolar membranes used in the three compartment water splitter may be those described above for the two compartment water splitter.

The cation membranes useful in the three compartment water splitter may be those described above for the two compartment water splitter.

The anion membranes employed in the process of the invention can be weakly basic or strong basic membranes such as those available from Ionics Inc., Watertown, Mass. (sold as Ionics 204-UZL-386 - Trade Mark), from Asahi Chemical Industry Co., from Asahi Glass Co. (AMV anion membranes), from Tokyama Soda or from R. A. I. Research Corporation. The latter membranes are preferred since they are resistant to oxidation.

In general, stacks that are suitable for electrodialysis can be used for the three compartment water splitter. Such stacks are available commercially from Asahi Glass Co., 1-2, Marunochi 2-chome, Chiyoda-ku, Tokyo, Japan; Ionics Inc., Watertown, Mass. and other commercial sources.

The operating temperature of the three compartment water splitter may be any temperature compatible with the membranes and above the freezing point of the solutions, perferably in the 20°-60° C. temperature range.

The alkaline salt could be any soluble salt consisting of a monovalent cation, for example, the Group Ia alkali metals or non-metal monovalent cations, for example, ammonium cations, and any anion, for example, the anions of the Group VIIa elements or other anions, for example, sulphate, acetate, oxalate, perhydroxyl, etc.

The operation of the water splitter is further described below:

The aqueous alkaline monosodium fed into the salt compartments of the electrohydrolysis stack is typically a 1:1 caustic to monosodium peroxide mixture but may also be composed of different ratios. Typically, the concentration of the alkaline monosodium peroxide solution is 0.5M in caustic and 0.5M in monosodium peroxide. These concentrations, however, can be higher or lower without adversely affecting the normal operation of the system. Preferably, the feed solution is free of large amounts of divalent and/or trivalent cations (e.g. $Ca^{++}$, $Mg^{++}$, $Fe^{++}$ or $Fe^{+++}$) that will either migrate across the cation membrane and precipitate in the by-product alkali metal hydroxide solution or will precipitate and foul the cation membrane. In this application, however, the problems arising from such cations, in trace amounts, are minimal, if not non-existent, since in the presence of excess sodium hydroxide colloidal hydroxides are formed which due to their slightly negative charge are not expected to migrate through the cationic membrane towards the cathode.

Magnesium sulphate is beneficial as a stabilizer in the feed solution in the amounts described for the two compartment cell and for the same reasons.

The liquid fed to the base compartments may be water alone, or may be water with any of a variety of electrolytes in it. Preferably, this liquid is neutral or basic (pH 7-14).

The current passed through the water splitter in conventional fashion is direct current of a voltage dictated by the resistance of the membranes and the various solution streams between the two electrodes. Current densities between about 50 to about 150 mAs per square centimeter are preferred. Higher or lower current densities are contemplated, however, for certain specific applications.

The result of the current flow is electrodialysis to produce a partially dealkalized and depleted monosodium peroxide solution in the salt compartments, a liquid comprising sodium hydroxide in the base compartments and a liquid comprising monosodium peroxide of the desired concentration and alkalinity or acidity in the acid compartments. It is contemplated that the concentration of the product sodium hydroxide solution from the base compartment may be quite different from the sodium hydroxide concentration in the feed alkaline monosodium peroxide solution. This can be accomplished by adjusting the feed rates into the salt and/or acid compartments or the concentrations of the feed solutions.

Representative monosodium peroxide concentrations in the feed solution are between 0.25 and 2M, while sodium hydroxide concentrations in these same solutions are 0.5 to 3M. The relative ratio of caustic to monosodium peroxide is dictated by the mode of operation of the hydrogen peroxide generator. If one begins with a feed solution which is 0.5M in monosodium peroxide and sodium hydroxide, which is a typical Dow Hydrogen Peroxide Generator solution, then the output of the acid compartments of the water splitter will be adjusted to be 0.0M in sodium hydroxide and 0.5M in monosodium peroxide. The output of the base compartments is usually set to be 1M.

The residence time of the aqueous alkaline alkali metal salt solution in the salt compartments is suitably sufficient to cause the output of the acid compartments to have molar ratios of $NaHO_2$ to $NaOH$ between 0 and 1. In particular, the residence time is sufficient to permit transfer of sufficient perhydroxyl anions to the acid compartment to produce a solution rich in the acid of the salt, for example, hydrogen peroxide.

Suitably, the liquid comprising aqueous alkali metal hydroxide withdrawn from the base compartment has a concentration between about 2 and about 10 weight percent alkali metal hydroxide.

BRIEF DESCRIPTION OF THE DRAWINGS

The invention is illustrated in preferred embodiments by reference to the accompanying drawings in which.

DESCRIPTION OF PREFERRED EMBODIMENTS WITH REFERENCE TO THE DRAWINGS

Figure 1:
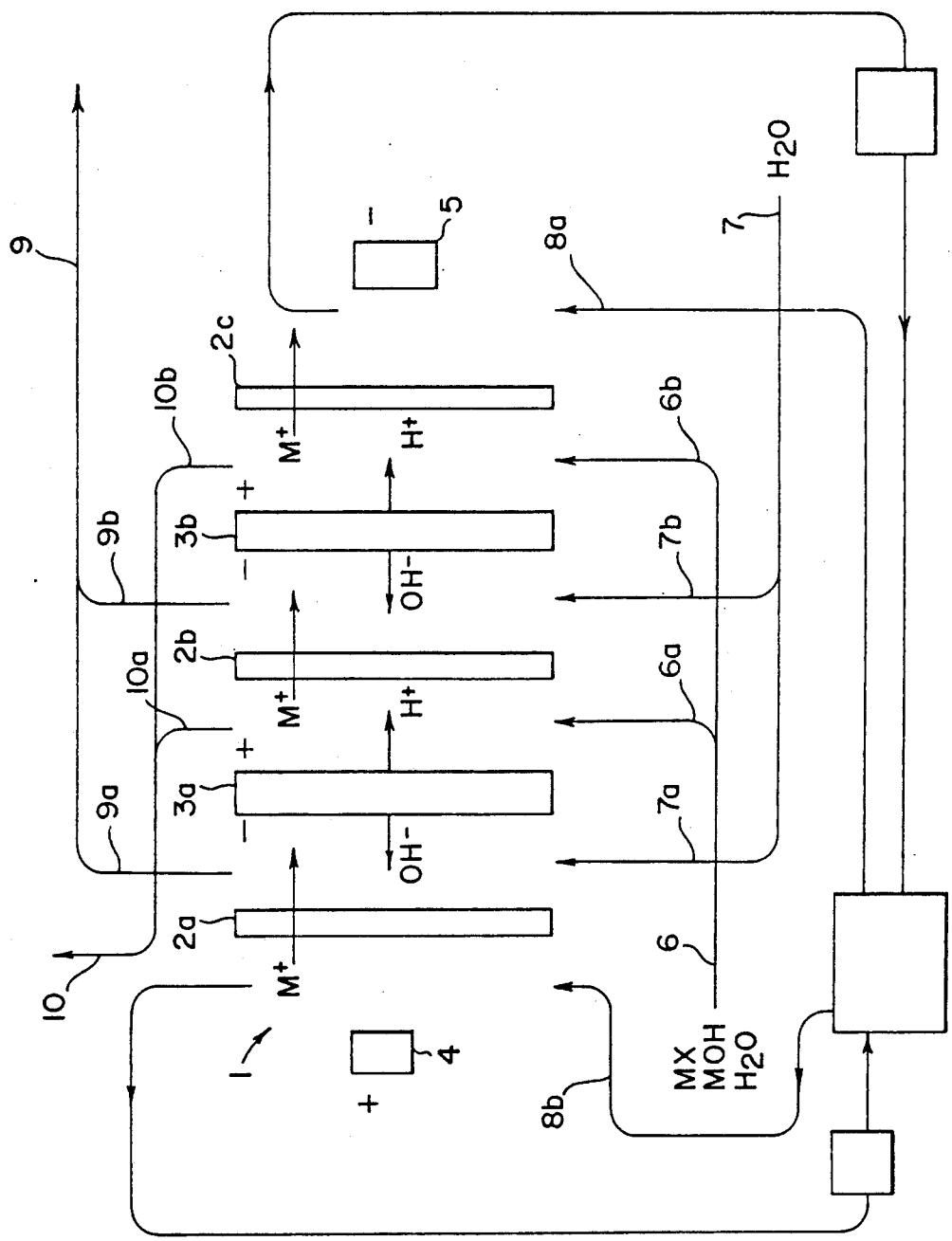
FIG. 1 illustrates schematically a two compartment cell.

FIG. 1 illustrates the process of the invention employing a two compartment cell. An electrohydrolysis stack 1 is shown with cationic membranes 2 and bipolar membranes 3 alternately stacked together between an anode 4 and a cathode 5. In FIG. 1 three cationic membranes 2a, 2b and 2c and two bipolar membranes 3a and 3b are shown, however, a much greater number of pairs can be incorporated between the two electrodes. A minimum of two cation membranes and one bipolar membrane are needed for a complete two compartment unit. The bipolar membranes are oriented with the cation permeable face towards the cathode 5.

An alkaline alkali metal salt such as monosodium peroxide is fed in stream 6 into the electrohydrolysis stack 1. A first portion 6a of aqueous salt stream 6 is fed between the cation permeable side of bipolar membrane 3a and the base cation membrane 2b. Similarly, aqueous stream 6b is fed between the positive side of bipolar membrane 3b and cationic membrane 2c. Simultaneously, a water stream 7, which may contain an electrolyte, and especially low concentrations of sodium hydroxide, is fed into electrohydrolysis stack 1 through stream 7a between cation membrane 2a and the anion permeable side of bipolar membrane 3a and stream 7b, between cation membrane 2b and the anion permeable side of bipolar membrane 3b.

An alkaline solution such as sodium hydroxide is fed to the compartments adjacent the anode and cathode in streams 8a and 8b from a reservoir, and return from these compartments to the reservoir, after degassing to remove hydrogen and oxygen. Current is passed between anode 4 and cathode 5 through the electrohydrolysis stack 1, causing alkali metal cations to migrate toward the cathode across the cationic membranes 2a, 2b and 2c. In addition water is induced to be split in bipolar membranes 3a and 3b with the hydrogen ions migrating to the compartments from which the alkali metal cations have migrated and the hydroxide anions migrating into the same compartments that the alkali metal ions have migrated into. Accordingly, alkali metal hydroxide is formed in each of the compartments between a cation membrane and the minus side of a bipolar membrane, and this alkali metal hydroxide is bled from the electrohydrolysis stack 1 through streams 9a and 9b and collected in stream 9 as aqueous alkali metal hydroxide. The compartments between the positive side of each bipolar and the adjacent side cation membrane will contain fully or partially dealkalized alkali metal salt which is bled from these compartments through streams 10a and 10b which are combined as a base product in stream 10.

Figure 2:
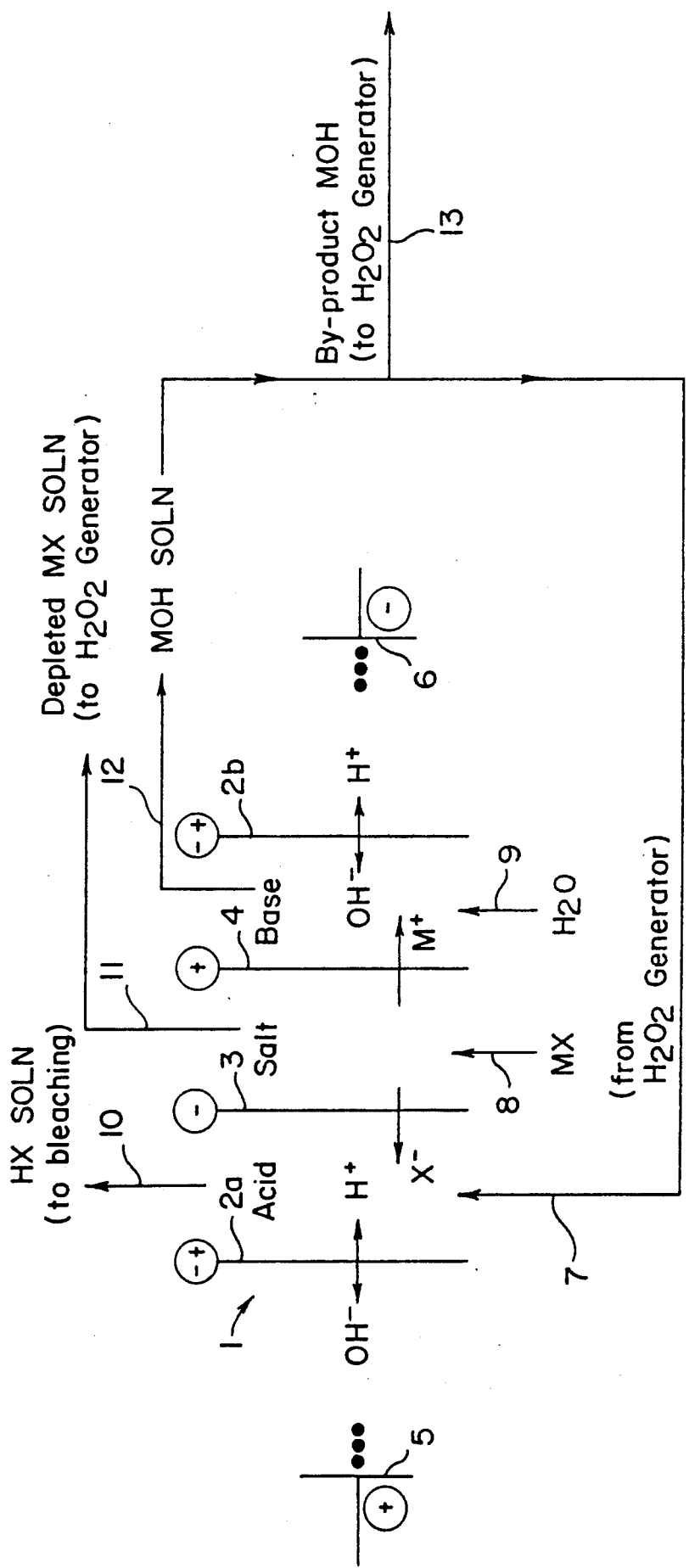
FIG. 2 illustrates schematically a three compartment cell electrohydrolysis stack of the invention.

FIG. 2 illustrates the process of the invention employing a three compartment cell. An electrohydrolysis stack 1 is shown with bipolar membranes 2, anionic membranes 3, and cationic membranes 4, alternately stacked together between an anode 5 and a cathode 6. In FIG. 2 two bipolar membranes 2a and 2b, one anionic membrane 3, and one cationic membrane 4, are shown, however, a much greater number of such units can be incorporated between the two electrodes as suggested by the three dots near each electrode in FIG. 2. A minimum of two bipolar, one anionic and one cationic membranes are needed for a complete three compartment unit. The bipolar membranes are oriented with the cation permeable face towards the cathode 6.

An alkaline alkali metal salt such as monosodium peroxide is fed in stream 8 into the electrohydrolysis stack 1 between the cationic and anionic membrane (salt compartment).

Simultaneously, a water stream 9, which may contain an electrolyte, and especially low concentrations of sodium hydroxide, is fed into electrohydrolysis stack 1 between cation membrane 4 and the anion permeable side of bipolar membrane 2b (base compartment). Moreover, a sodium hydroxide solution is fed in stream 7 into the electrohydrolysis stack 1 between anion membrane 3 and the positive side of bipolar membrane 2a (acid compartment). An alkaline solution such as sodium hydroxide is fed to the compartments adjacent the anode and cathode from a reservoir, and returned from these compartments to the reservoir, after degassing to remove hydrogen and oxygen.

Current is passed between anode 5 and cathode 6 through the electrohydrolysis stack 1, causing alkali metal cations to migrate toward the cathode across the cationic memebrane 4 and hydroxyl as well as perhydroxyl anions to migrate towards the anode across anionic membrane 3. In addition water is induced to be split in bipolar membranes 2a and 2b with the hydrogen ions migrating into the acid compartments and the hydroxide anions migrating into the base compartments. Accordingly, alkali metal hydroxide is formed in each of the compartments between a cation membrane and the minus side of a bipolar membrane, and this alkali metal hydroxide is bled from the electrohydrolysis stack 1 through stream 12. This stream can be further split into two other streams, 7 and 13, the first going to the acid compartment of the water splitter and the second going back to the hydrogen peroxide generator. The compartments between the positive side of each bipolar and the adjacent side anion membrane will contain fully or partially dealkalized alkali metal salt which is bled from these compartments through stream 10. The compartments between the cationic and the anionic membranes will contain a partially dealkalized and depleted alkaline monosodium peroxide solution which is bled from stream 11.

EXAMPLES

EXAMPLE 1

The cell shown in FIG. 1 was used to demonstrate how an alkaline $NaHO_2$ solution (i.e. Dow Hydrogen Peroxide Generator Output) can be dealkalized. A pilot cell stack consisting of eight, 2-compartment cells arranged between two electrodes was used. The arrangement of the cell is illustrated in FIG. 1. For simplicity this figure shows two cells with electrodes on either side. The cationic membranes were R. A. I. Research Corporation R-1010 membranes and the bipolar membranes were of the type having an amine-crosslinked polystyrene-vinylbenzyl chloride anion layer prepared in accordance with U.S. Pat. No. 4,116,889 to Chlanda et al. Each membrane has an exposed area of $125cm^2$. A 10% NaOH hydroxide solution was fed to the compartments adjacent to the anode and the cathode from a reservoir and returned to the reservoir, after degassing to remove hydrogen and oxygen. Each cell compartment was connected to its appropriate reservoir tank and the acid compartments operated in the batch mode while the base compartments were in the feed and bleed mode. A batch mode refers to the case in which the same solution is being recirculated continuously through the system while the feed and bleed mode refers to a case in which fresh solution is continuously fed into and bled from the system.

Initially, the salt loop was filled with a solution that was 0.68M in $NaHO_2$ and 0.32M in NaOH while the base compartment was filled with a 1M solution of NaOH in order to maintain conductivity in the system in the early stages of the run. The feed solution into the base compartments was water at a feed rate of 36 mL/min. The initial electrical input was 13 amps at 23 V. At time intervals during the run small samples were taken from the reservoir of the acid compartment and analyzed for alkalinity by titration with HCl. These same samples were analyzed for $H_2O_2$ through an iodine titration.

As shown in Table 1, once the power was turned on, the concentration of sodium hydroxide in the acid compartments decreased over twenty two minutes from 0.32M to 0.05M, indicating that sodium cations are crossing the cationic membranes thus moving from the acid into the base compartments. It is also shown in Table 1 that the concentration of $NaHO_2$ in the acid compartments remains approximately the same throughout the run thus indicating that very small amounts, if any, of hydrogen peroxide is crossing over into the base compartments.

TABLE 1

| Time mins | Conc. NaOH in Acid Compt., M | Conc. NaHO$_2$ in Acid Compt., M |
| --- | --- | --- |
| 0 | 0.32 | 0.68 |
| 11 | 0.20 | 0.67 |
| 22 | 0.05 | 0.66 |

EXAMPLE 2

The cell of FIG. 1, referred to in example 1, was also used in example 2. In this case, however, both the acid and base compartments were operated in the feed and bleed mode. Table I shows the conditions used for the operation of the cell stack.

TABLE 2

|  | Base | Salt |
| --- | --- | --- |
| Initial Concentration, M |  |  |
| NaOH | 1.2 | 0.0 |
| NaHO$_2$ | 0.0 | 0.5 |
| MgSO$_4$ |  | 120 ppm |
| Circulation Rate, gpm | 1.0 | 0.83 |
| Pressure, psi | 2.7 | 2.7 |
| Feed Soln. Concentration, M |  |  |
| NaOH | 0.0 | 0.5 |
| NaHO$_2$ | 0.0 | 0.5 |
| MgSO$_4$ |  | 120 ppm |
| Feed Rate, mL/min | 44 | 126 |
| Actual Feed Rate, meq/min |  |  |
| NaOH | 0.0 | 63.0 |
| NaHO$_2$ | 0.0 | 63.0 |

Initially, the acid compartments were filled with a solution 0.5M in NaHO$_2$, containing also 120 ppm of MgSO$_4$ whereas the base compartments were filled with a 1.2M sodium hydroxide solution. Magnesium sulphate was added to the acid compartments in order to prevent the decomposition of hydrogen peroxide. The decomposition of this species is otherwise quite pronounced for equimolar 0.5M NaOH, H$_2$O$_2$ solutions as shown in Table 3. Table 3 presents the residual concentration (M) of hydrogen peroxide in such solutions at various time intervals and concentrations of added magnesium sulphate stabilizer (ppm). As shown in this table, at very small concentrations (e.g. 1 ppm) MgSO$_4$ acts as a destabilizer, whereas at concentrations over 10 ppm it begins to act as a stabilizer. At concentrations over about 100 ppm there is almost no decomposition of hydrogen peroxide. From mass balance studies we found that at these levels MgSO$_4$ can act as an effective stabilizer in the electrohydrodynamic environment of the water splitter as well. Concentrations of MgSO$_4$, however, higher than 400 ppm should be avoided since precipitation of Mg(OH)$_2$ begins to occur within the water splitter and in addition the stabilizing effect is greatly diminished.

TABLE 3

| Time Hours | MgSO$_4$, ppm | | | | |
| --- | --- | --- | --- | --- | --- |
|  | 0 | 1 | 10 | 60 | 120 |
| 0 | 0.49 | 0.49 | 0.49 | 0.49 | 0.49 |
| 24 | 0.40 | 0.31 | 0.47 | 0.47 | 0.49 |
| 90 | 0.32 | 0.14 | 0.37 | 0.41 | 0.48 |

The reason for filling the various compartments with the solutions indicated in Table 2 was to maintain high conductivity throughout the stack during the initial stages of the run. The feed solution for the acid compartments was a simulated Dow Generator solution (0.5M NaOH, 0.5M NaHO$_2$) 120 ppm in MgSO$_4$. The feed solution for the base compartments was water. The circulation rates, that is the rates at which solutions are circulated through the membrane compartments and the corresponding recirculation tanks, were adjusted at 1.0 and 0.83 gpm so that the pressure in the two compartments would be about the same at 2.7 psi. The feed rates into the acid and base compartments were 126 and 44 mL/min respectively. The former feed rate was chosen in order to achieve a 0.52M concentration of Na$^+$ in the bleed solution of the acid compartments. At higher or lower feed rates the Na$^+$ concentration of the bleed solution from the acid compartments is higher or lower respectively than 0.52M and hence a 1:1 ratio of NaOH to H$_2$O$_2$ can not be achieved (see table 4).

TABLE 4

| Acid Compt. Feed Rate mL/min | Na$^+$ conc. M | HO$_2^-$ conc. M | Na$^+$/$^-$OOH Ratio |
| --- | --- | --- | --- |
| 88 | 0.47 | 0.52 | 0.90 |
| 113 | 0.46 | 0.52 | 0.88 |
| 123 | 0.50 | 0.52 | 0.97 |
| 126 | 0.52 | 0.52 | 1.04 |
| 131 | 0.50 | 0.52 | 0.97 |
| 172 | 0.70 | 0.52 | 1.35 |

At 126 mL/min, conductivity in the acid compartments in 30 mS/cm, which is not optimum in terms of power efficiency; it is, however, within the practically useful range. The electrical input was 13 amps at 24.5 V.

Small samples from the reservoirs of the acid compartments were taken at intervals and analyzed for alkalinity by titration with HCl. These same samples were also analyzed for H$_2$O$_2$ through an iodine titration. Samples were also taken from the base compartments and analyzed for alkalinity by titration with HCl. On the basis of the latter analysis the current efficiency of the system (see Table 5) was calculated. A constant current efficiency of over 95% was observed over the duration of the run which was 6.5 hrs.

TABLE 5

|  | Base | Acid |
| --- | --- | --- |
| Bleed Soln. Concentration, M |  |  |
| NaOH | 1.29 | 0.00 |
| NaHO$_2$ | 0.00 | 0.51 |
| Bleed Rate, mL/min | 48.3 | 122 |
| Actual Bleed Rate, meq/min |  |  |
| NaOH | 62.3 | 0.0 |
| NaHO$_2$ | 0.0 | 62.2 |
| Net Production Rate, meq/min |  |  |
| NaOH | 62.3 | −63.0 |
| NaHO$_2$ | 0.0 | −0.8 |
| Current Efficiency for Na$^+$, % | 96 |  |

Under the indicated conditions, the bleed solution from the acid compartments was 0.52M in NaHO$_2$ at 114mL/min (1:1 NaOH, H$_2$O$_2$ solution) while from the base compartments 1.2M NaOH at 53 mL/min. These figures suggest that Na$^+$ cations are crossing the cationic membrane and entering the base compartments. In terms of net production rates 63 meq/min of NaOH are removed from the acid compartments and 63 meq/min of NaOH are produced in the base compartments. These figures suggest that Na$^+$ cations are crossing the cationic membrane and entering the base compartments. Moreover, these figures show that the loss of hydrogen peroxide crossing the cationic membrane or being decomposed in minimal in the hydrodynamic environment of the two-compartment water splitter.

EXAMPLE 3

The cell employed in examples 1 and 2 was also used to examine the effect of co-product concentration on the current efficiency and on product bleed rate. The experiment was designed so that a 10%(2.8M) caustic solution would be produced form the base compartments instead of the 5% caustic solution produced in example 1. All experimental variables were held the same as in example 2 except for the feed rates into the acid and base compartments which were adjusted so that the desired product concentrations can be achieved (see Table 6).

TABLE

|  | Base | Salt |
|---|---|---|
| Initial Concentration, M |  |  |
| NaOH | 1.2 | 0.0 |
| $NaHO_2$ | 0.0 | 0.5 |
| $MgSO_4$ |  | 120 ppm |
| Circulation Rate, gpm | 1.0 | 0.83 |
| Pressure, psi | 2.7 | 2.7 |
| Feed Soln. Concentration, M |  |  |
| NaOH | 0.0 | 0.5 |
| $NaHO_2$ | 0.0 | 0.5 |
| $MgSO_4$ |  | 120 ppm |
| Feed Rate, mL/min | 15.8 | 111.3 |
| Actual Feed Rate, meq/min |  |  |
| NaOH | 0.0 | 55.7 |
| $NaHO_2$ | 0.0 | 55.7 |

The feed rate into the acid compartments was 111.3 mL/min and into the base compartments was 15.8 mL/min. As shown in Table 7, at steady state, a solution of 0.51M $NaHO_2$ is produced from the acid compartments whereas a 2.82M solution of NaOH is produced from the base compartments.

TABLE 7

|  | Base | Acid |
|---|---|---|
| Bleed Solution Concentration, M |  |  |
| NaOH | 2.82 | 0.0 |
| $NaHO_2$ | 0.0 | 0.51 |
| Bleed Rate, mL/min | 20.8 | 110.2 |
| Actual Bleed Rate, meq/min |  |  |
| NaOH | 58.7 | 0.0 |
| $NaHO_2$ | 0.0 | 56.2 |
| Net Production Rate, meq/min |  |  |
| NaOH | 58.7 | −55.65 |
| $NaHO_2$ | 0.0 | −0.55 |

The current efficiency in this process is quite high at 90.6+0.7% even though it is lower than that obtained in Example 2 by about 5%. A reduced bleed rate of about 20.7 mL/min is obtained as a result of the reduced current efficiency. The complete dealkalization, however, of the alkaline $NaHO_2$ feed solution contains to be feasible under the new experimental conditions.

EXAMPLE 4

The cell shown in FIG. 2 was used to demonstrate how an alkaline $NaHO_2$ solution (i.e. Dow Hydrogen Peroxide Generator Output) can be completely dealkalized. A pilot cell stack consisting of eight, 3-compartment cells arranged between two electrodes was used. The arrangement of the cell is illustrated in FIG. 2. For simplicity this figure shows one cell with electrodes on either side. The cationic membranes were Dupont's Nafion R 110 flourocarbon membranes, the bipolar membranes were of the type having an amine-cross-linked polystyrene-vinylbenzyl chloride anion layer prepared in accordance with U.S. Pat. No. 4,116,889 to Chlanda et al and the anionic membranes were of a type resistant to oxidants supplied by the RAI Research Corporation. Each membrane had an exposed area of 125 $cm^2$. A 10% NaOH hydroxide solution is fed to the compartments adjacent to the anode and the cathode from a reservoir and returned to the reservoir, after degassing to remove hydrogen and oxygen. Each cell compartment was connected to its appropriate reservoir tank and all compartments operated in the batch mode. A batch mode refers to the case in which the same solution is being recirculated continuously through the system while the feed and bleed mode refers to a case in which fresh solution is continuously fed into and bled from the system. Table 8 shows the conditions used for the operation of the cell stack.

TABLE 8

|  | Acid | Base | Salt |
|---|---|---|---|
| Initial Concentration, M |  |  |  |
| NaOH | 0.49 | 1.78 | 0.88 |
| $NaHO_2$ | 0.0 | 0.0 | 0.86 |
| $MgSO_4$ | 120 ppm |  |  |
| Circulation Rate, gpm | 0.8 | 0.8 | 0.8 |
| Initial Loop Volume, L | 3.5 | 3.4 | 1.6 |

Initially, the Acid compartments were filled with a solution that was 0.49M in NaOH, the Base compartments with a solution 1.78M in NaOH and the salt compartment with a solution 0.88M in NaOH and 0.86M in $NaHO_2$. The circulation rates, that is the rates at which solutions are circulated through the membrane compartments and the corresponding recirculation tanks were adjusted at 0.8 gpm in all compartment. The initial loop volumes in the three compartments were 3.5, 3.4 and 4.6 liters for the acid, base and salt compartments respectively. The initial electrical input was 13 amps at 25 V. At time intervals during the run small samples were taken from the reservoirs of the three compartments and analyzed for alkalinity by titration with HCl. These same samples were analyzed for $H_2O_2$ through an iodine titration.

Table 9 demonstrates the changes in the concentration of sodium hydroxide and monosodium peroxide in the three compartments once the power was turned on and the system allowed to run for 120 minutes.

TABLE 9

| Time | NaOH Conc., M | | | $NaHO_2$ Conc., M | | |
|---|---|---|---|---|---|---|
| Min | Acid | Base | Salt | Acid | Base | Salt |
| 0 | 0.49 | 1.78 | 0.88 | 0 | 0 | 0.86 |
| 20 | 0.39 | 2.00 | 0.70 | 0.10 | 0 | 0.81 |
| 50 | 0.30 | 2.35 | 0.50 | 0.19 | 0.01 | 0.72 |
| 70 | 0.20 | 2.59 | 0.33 | 0.28 | 0.01 | 0.66 |
| 120 | 0.00 | 3.00 | 0.12 | 0.46 | 0.02 | 0.36 |

As shown in Table 9 the concentration of sodium hydroxide in the salt compartments decreased over the duration of the experiment from 0.88M to 0.12M while the concentration of sodium hydroxide in the base compartment increased from 1.78M to 3.00M; this indicates that sodium cations are crossing the cationic membranes thus moving from the salt into the base compartments. It is also shown in Table 9 that the concentration of monosodium peroxide in the salt compartments decreased over the duration of the experiment from 0.86M to 0.36M while the concentration of monosodium peroxide in the acid compartment increased from 0 to 0.46M; this indicates that perhydroxyl anions are crossing the anionic membranes thus moving from the salt into the acid compartments. The concentration of monosodium peroxide in the base compartments remained at about 0M during the run thus indicating that very small amounts, if any, of perhydroxyl anions are crossing the cationic membrane into the base compartments.

Table 10 presents the current efficiencies obtained for the trasport of $Na^+$ to the base compartment and the transport of $HO_2^-$ and $OH^-$ to the acid compartment in the duration of the experiment.

TABLE 10

| Time | Current Efficiency % | | |
|---|---|---|---|
| mins | $Na^+$ | $HO_2^-$ | $OH^-$ |
| 0-20 | 74.2 | 24.7 | 49.5 |
| 20-50 | 77.3 | 21.0 | 56.3 |
| 50-70 | 92.4 | 24.7 | 67.7 |
| 70-120 | 74.5 | 27.4 | 47.1 |
| 0-120 | 78.3 | 25.0 | 53.3 |

As shown in Table 10 the sodium cation current efficiencies are on the average about 78% and typically about 75%. For the perhydroxyl anion the current efficiencies are on the average 25% and about 25% throughout the duration of the experiment. The reason for the relatively low current efficiency for the perhydroxyl ions is that they compete with the hydroxyl ions in crossing over to the acid compartment.

EXAMPLE 5

The cell of FIG. 2 referred to in example 4 was also used in example 5. In this case, however, all three compartments were operated in the feed and bleed mode. Table 11 shows the conditions used for the operation of the cell stack.

TABLE 11

|  | Acid | Base | Salt |
|---|---|---|---|
| Initial Concentration, M |  |  |  |
| NaOH | 0.00 | 1.10 | 0.50 |
| $NaHO_2$ | 0.80 | 0.00 | 0.50 |
| $MgSO_4$ | 120 ppm |  |  |
| Circulation Rate, gpm | 0.80 | 1.0 | 1.0 |
| Feed Solution Conc., M |  |  |  |
| NaOH | 1.09 | 0.0 | 0.5 |
| $NaHO_2$ | 0.00 | 0.0 | 0.5 |
| Feed Rate, mL/min | 16.8 | 53.5 | 112.6 |
| Actual Feed Rate, meq/min |  |  |  |
| NaOH | 18.3 | 0.0 | 56.3 |
| $NaHO_2$ | 0.0 | 0.0 | 56.3 |

Initially, the acid compartments were filled with a solution 0.8M in $NaHO_2$, containing also 120 ppm of $MgSO_4$ whereas the base compartments were filled with a 1.10M sodium hydroxide solution. The salt compartments were filled with a solution 0.50M in NaOH and 0.50M in $NaHO_2$. Magnesium sulphate was added to the acid compartments in order to prevent the decomposition of hydrogen peroxide migrating into these compartments. The decomposition of this species is otherwise quite pronounced for equimolar 0.5M NaOH, $H_2O_2$ solutions as shown in Table 12. Table 12 presents the residual concentration (M) of hydrogen peroxide in such solutions at various time intervals and concentrations of added magnesium sulphate stabilizer (ppm). As shown in this table, at very small concentrations (e.g. 1 ppm) $MgSO_4$ acts as a destabilizer, whereas at concentrations over 10 ppm it begins to act as a stabilizer. At concentrations over about 100 ppm there is almost no decomposition of hydrogen peroxide. From mass balance studies we found that at these levels $MgSO_4$ can act as an effective stabilizer in the electrohydrodynamic environment of the water splitter as well. Concentrations of $MgSO_4$, however, higher than 400 ppm should be avoided since precipitation of $Mg(OH)_2$ begins to occur within the water splitter and in addition the stabilizing effect is greatly diminished.

TABLE 12

| Time | $MgSO_4$, ppm | | | | | |
|---|---|---|---|---|---|---|
| Hours | 0 | 1 | 10 | 60 | 120 | 240 |
| 0 | 0.49 | 0.49 | 0.49 | 0.49 | 0.49 | 0.49 |
| 24 | 0.40 | 0.31 | 0.47 | 0.47 | 0.49 | 0.49 |
| 90 | 0.32 | 0.14 | 0.37 | 0.41 | 0.48 | 0.49 |

The reason for filling the various compartments with the solutions indicated in Table 12 was to maintain high conductivity throughout the stack during the initial stages of the run. The feed solution for the salt compartments was a simulated Dow Generator solution (0.5M NaOH, 0.5M $NaHO_2$). The feed solution for the base compartments was water and for the acid compartments was 1.09M NaOH, 120 ppm in $MgSO_4$. The feed rates into the acid, base and salt were 16.8, 53.8 and 112.6 mL/min respectively. These particular rates were chosen in order to achieve the desired ratio of 0:1 $NaOH/NaHO_2$ in the output of the acid compartment and a concentration of $NaHO_2$ of about 0.8M. The circulation rates, that is the rates at which solutions are circulated through the membrane compartments and the corresponding recirculation tanks, were adjusted at 0.8, 1.0 and 1.0 gpm. The electrical input was 13 amps at 27 V.

Small samples from the reservoirs of the acid, base, and salt compartments were taken at intervals and analyzed for alkalinity by titration with HCl. These same samples were also analyzed for $H_2O_2$ through an iodine titration. On the basis of the latter analysis the current efficiency of the system (see Table 13) was calculated. A constant current efficiency of about 90% for $Na^+$ and 30% for $HO_2^-$ was observed over the duration of the run which was 6.0 hrs. The rather low current efficiency for $HO^{2-}$ is due to the fact that $OH^-$ anions are also crossing the anionic membrane, thus competing with the the perhydroxyl ions.

TABLE 13

|  | Acid | Base | Salt |
|---|---|---|---|
| Bleed Solution Concentration, M |  |  |  |
| NaOH | 0.00 | 1.10 | 0.160 |
| $NaHO_2$ | 0.79 | 0.03 | 0.35 |
| Bleed Rate, mL/min | 24.7 | 52.3 | 97.0 |
| Actual Bleed Rate, meq/min |  |  |  |
| NaOH | 0.0 | 57.5 | 15.5 |
| $NaHO_2$ | 19.5 | 1.6 | 34.0 |
| Net Production Rate, meq/min |  |  |  |
| NaOH | −18.3 | 57.5 | −40.8 |
| $NaHO_2$ | 19.5 | 1.6 | −22.3 |
| Current Efficiency for |  |  |  |
| $Na^+$, % |  | 90 |  |
| $HO_2-$, % |  | 30 |  |

As shown in Table 13, the bleed solution from the acid compartments was 0.79M in $NaHO_2$ at 24.7 mL/min (1:1 NaOH, $H_2O_2$ solution) while from the base compartments 1.10M NaOH at 52.3 mL/min. The concentration of the bleed solution from the base compartment was specifically adjusted to be 1.1M in order to demonstrate that it can be of a concentration that can be fed directly into the acid compartment as shown in FIG. 2; since, however, sodium hydroxide at this concentration is required only at the rate of 18.3 mL/min in the acid compartment the excess 34 mL/min of sodium hydroxide can be recycled to the hydrogen peroxide generator or be used for other purposes. The bleed solution from the salt was 0.16M in NaOH and 0.35M in $NaHO_2$ at 97 mL/min. in terms of net production rates for NaOH, 40.8 meq/min of NaOH are being removed from the salt compartment and 18.3 meq/min are being consumed in the acid compartment while 57.5 meq/min are being produced from the base compartment. In terms of net production rates for $NaHO_2$, 22.3 meq/min are being removed from the salt compartment, while 19.5 meq/min are produced from the acid compartment. These figures suggest that Na+ cations are crossing the cationic membrane and entering the base compartments and $HO_2$ are crossing the anionic membranes and entering the acid compartments. Moreover, these figures show that the loss of hydrogen peroxide to decomposition is minimal and hence magnesium hydroxide at 120 ppm can act as an effective stabilizer in the electrohydrodynamic environment of the three compartment water splitter.

We claim:

1. a process which comprises the steps of
   (a) providing a cell comprising an anode, a cathode and at least two compartments therebetween defined at least in part by a cation permselective membrane and at least a pair of bipolar membranes, said bipolar membranes having an anion side facing said anode and a cation side facing said cathode,
   (b) feeding an aqueous alkaline solution comprising monosodium peroxide and sodium hydroxide into a first of said compartments to contact a first side of said cation permselective membrane,
   (c) feeding a liquid comprising water into a second of said compartments to contact an anion side of a said bipolar membrane,
   (d) passing a direct current through said cell between said anode and cathode to effect:
      (i) migration of sodium cations from said first compartment through said cation permselective membrane into said second compartment, and
      (ii) splitting of water by said bipolar membrane of said second compartment with accumulation of hydroxide ions of the water in said second compartment and removal of hydrogen ions of the water from aid second compartment,
   (e) removing accumulated NaOH from said second compartment, and
   (f) removing accumulated dealkalized monosodium peroxide solution from said first compartment.

2. A process according to claim 1, wherein said cell is a two compartment cell, said first compartment being defined between said first side of said cation permselective membrane and a cation side of a first bipolar membrane, and said second compartment being defined between a second side of said cation permselective membrane and an anion side of a second bipolar membrane.

3. A process according to claim 1, wherein acid and salt chambers are defined in said first compartment separated by an anion permselective membrane, said salt chamber being defined between said anion permselective membrane and said cation permselective membrane, said acid chamber being defined between said anion permselective membrane and a cation side of a said bipolar membrane, and said second compartment defining a base chamber; and wherein step (b) comprises feeding said aqueous alkaline solution into said salt chamber; and step (c) comprises feeding a liquid comprising water into said base chamber.

4. A process according to claim 3, further including feeding a liquid comprising water into said acid chamber.

5. A process according to claim 4, wherein step (f), comprises removing the acid of the salt from said acid chamber.

6. A process according to claim 5, further including removing depleted aqueous monosodium peroxide solution from said salt chamber.

7. A process for the dealkalization of an aqueous alkaline alkali metal peroxide solution comprising:
   (a) establishing an electrolytic cell comprising an anode, a cathode and a plurality of membranes therebetween, said plurality of membranes including spaced apart bipolar membranes and a cation permselective membrane disposed between each pair of bipolar membranes, said bipolar membranes each having an anion side facing said anode and a cation side facing said cathode, and a plurality of side-by-side compartments defined between adjacent membranes of said plurality,
   (b) feeding an aqueous alkaline solution of a salt MX and a hydroxide MOH, in which M is an alkali metal cation and X is an anion of an acid into a first compartment of said plurality to contact a first side of a said cation permselective membrane,
   (c) feeding a liquid comprising water into a second compartment of said plurality to contact an anion side of a said bipolar membrane,
   (d) passing a direct current through said cell between said anode and cathode to effect:
      (i) migration of said cation M from said first compartment through said cation permselective membrane into said second compartment,
      (iii) splitting of water by said bipolar membrane of said second compartment with accumulation of hydroxide ion of the water in said second compartment and removal of hydrogen ions of the water from said second compartment
   (e) removing accumulated MOH from said second compartment, and
   (f) removing accumulated dealkalized MX from said first compartment.

8. A process which comprises the steps:
   (a) feeding an aqueous alkaline alkali metal salt solution of $NaHO_2$ and NaOH into each acid compartment between a cation membrane and a cation side of a bipolar membrane of an electrodialytic water splitter comprised of alternating cation and bipolar membranes positioned between an anode and a cathode;
   (b) feeding into each base compartment between a cation membrane and an anion side of a bipolar membrane, a liquid comprising water;
   (c) passing a direct current through said water splitter thereby causing dealkalization or acidification of said aqueous alkaline alkali metal salt solution and basification of said liquid comprising water through transfer of sodium cations from said aqueous alkaline alkali metal salt solution to said liquid comprising water, (d) bleeding form the base compartments a liquid comprising aqueous sodium hydroxide, (e) bleeding from the acid compartments a dealkalized or acidified aqueous $NaHO_2$ solution.

9. The process of claim 8, wherein the initial molar ratio of NaOH to $NaHO_2$ is 1:1.

10. The process of claim 9, wherein the initial molar concentration of NaOH and $NaHO_2$ in said aqueous alkaline solution in step (a) is 0.5M NaOH and 0.5M $NaHO_2$.

11. The process of claim 10, wherein magnesium sulphate at a concentration of 120 ppm is added to said alkaline alkali metal salt solution for preventing the decomposition of hydrogen peroxide.

12. The process of claim 8, wherein the residence time of said aqueous alkaline alkali metal salt solution in the acid compartments is sufficient to cause this solution to have a molar ratio of NaOH to $NaHO_2$ between 0 and 1.

13. The process of claim 8, wherein the residence time of the aqueous alkaline alkali metal salt solution in the acid compartments is sufficiently long to dealkalize completely this solution and furthermore acidify it to have molar ratios of acid ($H_2O_2$) to said ($NaHO_2$) between 0 and 1.13.

14. The process of claim 12, wherein the liquid comprising aqueous sodium hydroxide withdrawn from the base compartments has a concentration between about 4 and about 10 weight percent sodium hydroxide.

15. The process of claim 12, wherein said dealkalized $NaOH_2$ solution is passed directly to a unit for bleaching of mechanical pulps.

16. The process of claim 13, wherein said sodium hydroxide is passed to a unit for bleaching of chemical or mechanical pulps or is recycled to a hydrogen peroxide generator.

17. The process of claim 11, wherein trace amounts of divalent and trivalent metal ion impurities and corresponding anions are present in the alkaline alkali metal salt solution.

18. A process which comprises the steps:
(a) feeding an aqueous alkaline or nonalkaline solution of an alkali metal and/or non-metal salt into a three compartment water splitter composed of alternating cation, bipolar and anionic membranes, said solution being introduced into each salt compartment between a cation membrane and an anion membrane;

(b) feeding a liquid comprising water into each base compartment, between a cation membrane and an anion side of a bipolar membrane, (c) feeding into each acid compartment, between an anion membrane and a cation side of a bipolar membrane, a solution of alkali metal and/or nonmetal hydroxide of a concentration equivalent to a desired concentration of a salt to be produced;

(d) passing a direct current through said water splitter thereby causing transfer of alkali metal cations from said solution of a salt to the base compartment thereby causing basification of said liquid comprising water and in addition causing the transfer of hydroxide anions and anions of the salt to the acid compartment thereby causing the formation of water and the acid of the anion of the salt, said acid reacting with the added alkali metal hydroxide in said acid compartment to produce the salt of the anion and water;

(e) bleeding from the salt compartments a partially dealkalized and depleted aqueous salt solution, (f) bleeding from the base compartments a liquid comprising aqueous alkali metal hydroxide; and (g) bleeding from the acid compartments a dealkalized salt solution.

19. The process of claim 18, wherein said alkaline alkali metal salt is $NaHO_2$ in a solution comprising NaOH.

20. The process of claim 19, wherein the initial molar ratio of NaOH to $NaHO_2$ is 1:1.

21. The process of claim 20, wherein the initial concentration is 0.5M in NaOH and $NaHO_2$.

22. The process of claim 21, wherein magnesium sulphate at a concentration of 120 ppm is added to said acid compartments for preventing the decomposition of hydrogen peroxide.

23. The process of claim 18, wherein the residence time of said aqueous alkaline alkali metal salt solution in the salt compartments is sufficient to cause the output of the acid compartments to have molar ratios of $NaHO_2$ to NaOH between 0 to 1.

24. The process of claim 18, wherein the residence time of said aqueous alkaline alkali metal salt in the salt compartments is sufficiently long to permit the transfer of sufficient perhydroxyl anions to the acid compartment to produce a solution rich in the acid of the salt.

25. The process of claim 23, wherein the liquid comprising aqueous alkali metal hydroxide withdrawn from the base compartments has a concentration between about 2 and about 10 weight percent alkali metal hydroxide.

26. The process of claim 23, wherein the output of the acid compartments is passed directly to a unit for bleaching of mechanical pulps.

27. The process of claim 23, wherein part of said alkali metal hydroxide is recycled to the acid compartment of the water splitter and part is recycled to a hydrogen peroxide generator or to a unit for the bleaching of chemical or mechanical pulps.

28. The process of claim 23, wherein said output of the salt compartment is fed into another water splitter or recycled into a hydrogen peroxide generator.

29. The process of claim 18, wherein said salt is of the type whose ions do not hydrolyze in water in a solution comprising sodium hydroxide.

30. The process of claim 18, wherein said salt is of the type whose anions hydrolyze but cations do not, other than monosodium peroxide.

31. The process of claim 18, wherein said salt is of the type whose cations hydrolyze but whose anions do not, in a solution comprising sodium hydroxide.

32. The process of claim 18, wherein said salt is of the type whose cations and anions hydrolyze, in a solution comprising sodium hydroxide.

33. The process of claim 18, wherein said salt solution contains soluble non-conductive compounds and/or insoluble but suspended compounds.

34. The process of claim 22, wherein trace amounts of divalent or trivalent metal ion impurities and corresponding anions are present in one or more of said solution of an alkaline metal introduced to said salt compartment, said liquid comprising water fed to said base compartment and said solution of hydroxide fed to said acid compartment.

* * * * *